United States Patent
Zhong et al.

(10) Patent No.: US 8,063,306 B2
(45) Date of Patent: Nov. 22, 2011

(54) RE-ENTERABLE SPLICE ENCLOSURE

(75) Inventors: Jingwen Zhong, Shanghai (CN); Pierre Bonvallat, Cluses (FR); Zhiyong Xu, Shanghai (CN); Bin Lu, Shanghai (CN)

(73) Assignee: 3M Innovative Properties Company, St. Paul, MN (US)

( * ) Notice: Subject to any disclaimer, the term of this patent is extended or adjusted under 35 U.S.C. 154(b) by 184 days.

(21) Appl. No.: 12/444,071

(22) PCT Filed: Sep. 21, 2007

(86) PCT No.: PCT/US2007/079188
§ 371 (c)(1),
(2), (4) Date: Apr. 2, 2009

(87) PCT Pub. No.: WO2008/051671
PCT Pub. Date: May 2, 2008

(65) Prior Publication Data
US 2010/0038130 A1 Feb. 18, 2010

(30) Foreign Application Priority Data
Oct. 27, 2006 (CN) .......................... 2006 1 0149881

(51) Int. Cl.
*H02G 15/113* (2006.01)
(52) U.S. Cl. ....................................................... 174/92
(58) Field of Classification Search ..................... 174/92, 174/138 F
See application file for complete search history.

(56) References Cited

U.S. PATENT DOCUMENTS

| 4,538,021 A | 8/1985 | Williamson, Jr. |
| 4,610,738 A | 9/1986 | Jervis |
| 4,808,772 A | 2/1989 | Pichler et al. |
| 5,113,038 A | 5/1992 | Dehling |
| 5,347,084 A | 9/1994 | Roney et al. |
| 5,397,859 A | 3/1995 | Robertson et al. |

(Continued)

FOREIGN PATENT DOCUMENTS
EP 0 233 417 A1 8/1987
(Continued)

OTHER PUBLICATIONS

Supplementary European Search Report, dated Aug. 23, 2011, issued in EP 07842988.3.

*Primary Examiner* — Chau Nguyen
(74) *Attorney, Agent, or Firm* — Janet A. Kling

(57) ABSTRACT

A re-enterable enclosure for a cable splice includes a first cover member and a second cover member configured for engagement with each other, and movable between an open position and a closed position. The first and second cover members form a cavity for enclosing the cable splice when the cover members are in the closed position. Internal walls in at least one of the first and second cover members are configured to define a sealant containment space that at least partially surrounds the cavity. At least one latch is configured to maintain the first and second cover members in the closed position, the at least one latch configured to exert a compression force along a line extending through the sealant containment space.

11 Claims, 11 Drawing Sheets

U.S. PATENT DOCUMENTS

| | | |
|---|---|---|
| 5,525,073 A | 6/1996 | Sampson |
| 5,594,210 A | 1/1997 | Yabe |
| 5,674,089 A | 10/1997 | Sampson |
| 5,684,274 A | 11/1997 | McLeod |
| 5,696,351 A | 12/1997 | Benn et al. |
| 5,763,835 A | 6/1998 | Huynh-Ba et al. |
| 5,816,853 A | 10/1998 | Buekers et al. |
| 5,828,005 A | 10/1998 | Huynh-Ba et al. |
| 6,169,250 B1 | 1/2001 | Bolcato |
| 6,246,003 B1 | 6/2001 | Ferris et al. |
| 6,265,665 B1 | 7/2001 | Zahnen |
| 6,333,463 B1 * | 12/2001 | Bukovnik et al. ........... 174/77 R |
| 6,544,070 B1 | 4/2003 | Radliff |
| 6,633,000 B2 | 10/2003 | Kuo |
| 6,706,968 B2 | 3/2004 | Yaworski et al. |
| 6,893,291 B2 | 5/2005 | Wendling et al. |
| 7,141,738 B2 | 11/2006 | Marsac et al. |
| 2004/0238201 A1 | 12/2004 | Asakura et al. |
| 2005/0167147 A1 * | 8/2005 | Marsac et al. ................. 174/92 |
| 2005/0167431 A1 | 8/2005 | Stora |
| 2005/0239324 A1 | 10/2005 | Low et al. |
| 2008/0169116 A1 * | 7/2008 | Mullaney et al. ............... 174/92 |

FOREIGN PATENT DOCUMENTS

| | | |
|---|---|---|
| FR | 2 770 048 A1 | 4/1999 |
| JP | 62-501396 | 6/1987 |
| JP | 11-041781 | 2/1999 |
| JP | 11-204982 | 7/1999 |
| JP | 2002-056906 | 2/2002 |
| JP | 2002-543753 | 12/2002 |
| WO | WO 86/04181 | 7/1986 |
| WO | WO 97/16869 | 5/1997 |
| WO | WO 00/67354 | 11/2000 |
| WO | 03/94316 A1 | 11/2003 |

* cited by examiner

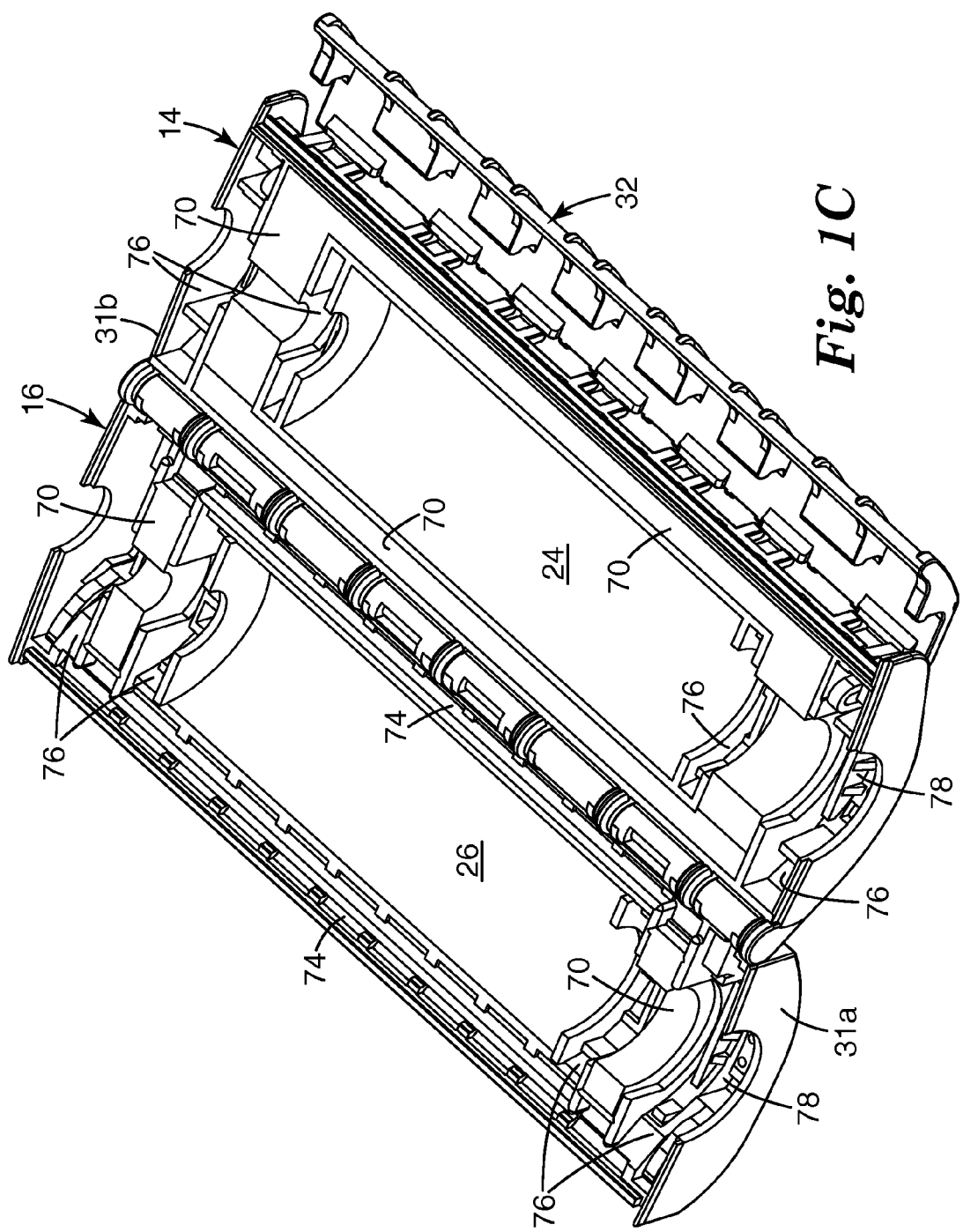

RE-ENTERABLE SPLICE ENCLOSURE

CROSS REFERENCE TO RELATED APPLICATIONS

This application is a national stage filing under 35 U.S.C. 371 of PCT/US2007/079188, filed 21 Sep. 2007, which claims priority to Chinese Patent Application No. 200610149881.9, filed 27 Oct. 2006, the disclosure of which is incorporated by reference in its/their entirety herein.

BACKGROUND

The present invention relates to an enclosure for a splice between cables. In particular, the present invention relates to an enclosure that can be re-opened to permit access to the cable splice when required and then re-sealed. Such an enclosure may be referred to as a re-enterable enclosure. The cable may, for example, be a telecommunications cable, a power cable, an optical fiber cable, coaxial cable, or any other type of cable. The cable splice enclosed by the enclosure may, for example, be a longitudinally-extending splice (i.e., a splice between cables that extend generally from opposite directions) or a so-called "pig-tail", or butt, splice (i.e., a splice between cables that extend generally from the same direction) or a distribution splice having at least one cable on one enclosure side and more than one cable on another side of the closure.

A cable splice generally requires protection from the effects of the environment in which it is located and, more particularly, requires protection against mechanical impact and the entry of moisture. Many different enclosures providing different levels of protection for cable splices are already available, including so-called re-enterable enclosures that can be re-opened to permit access to the splice whenever required.

Known re-enterable splice enclosures often take the form of a two-part re-openable housing that defines a cavity around the splice and contains a sealant material. The housing provides protection for the splice against mechanical impact and, in combination with the sealant material, protects the cavity against the entry of moisture while permitting access to the splice when the housing is re-opened. In some cases, the cavity is completely filled with sealant material, and, in other cases, the sealant material is provided only at points where moisture entry is likely, such as at cable entry points into the cavity and at joints of the housing.

SUMMARY

In one aspect, the present invention provides a re-enterable enclosure for a cable splice. In one embodiment, the enclosure comprises a first cover member and a second cover member configured for engagement with the first cover member. The first and second cover members are movable between an open position and a closed position, wherein the first and second cover members form a cavity for enclosing the cable splice when the cover members are in the closed position. Internal walls in at least one of the first and second cover members are configured to define a sealant containment space that at least partially surrounds the cavity. At least one latch is configured to maintain the first and second cover members in the closed position, the at least one latch configured to exert a compression force along a line extending through the sealant containment space.

BRIEF DESCRIPTION OF THE DRAWINGS

The present invention will be further described with reference to the accompanying drawings wherein like reference numerals refer to like parts in the several views, and wherein:

FIG. 1C is a perspective illustration showing sealant material in the splice enclosure of FIG. 1A.

DETAILED DESCRIPTION

Figure 1A:
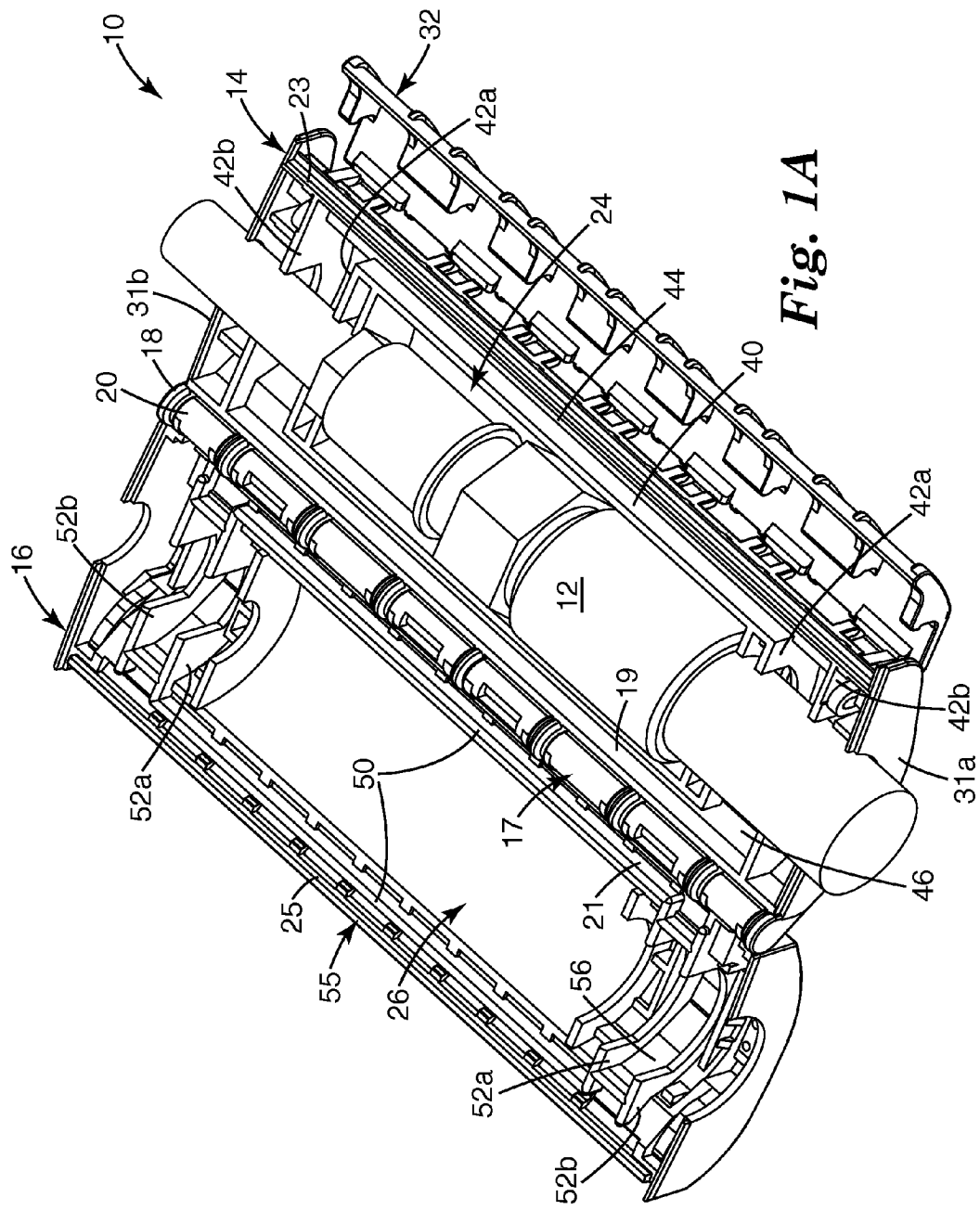
FIG. 1A is a perspective illustration of one embodiment of a splice enclosure according to the invention, in an open position.
Figure 1B:
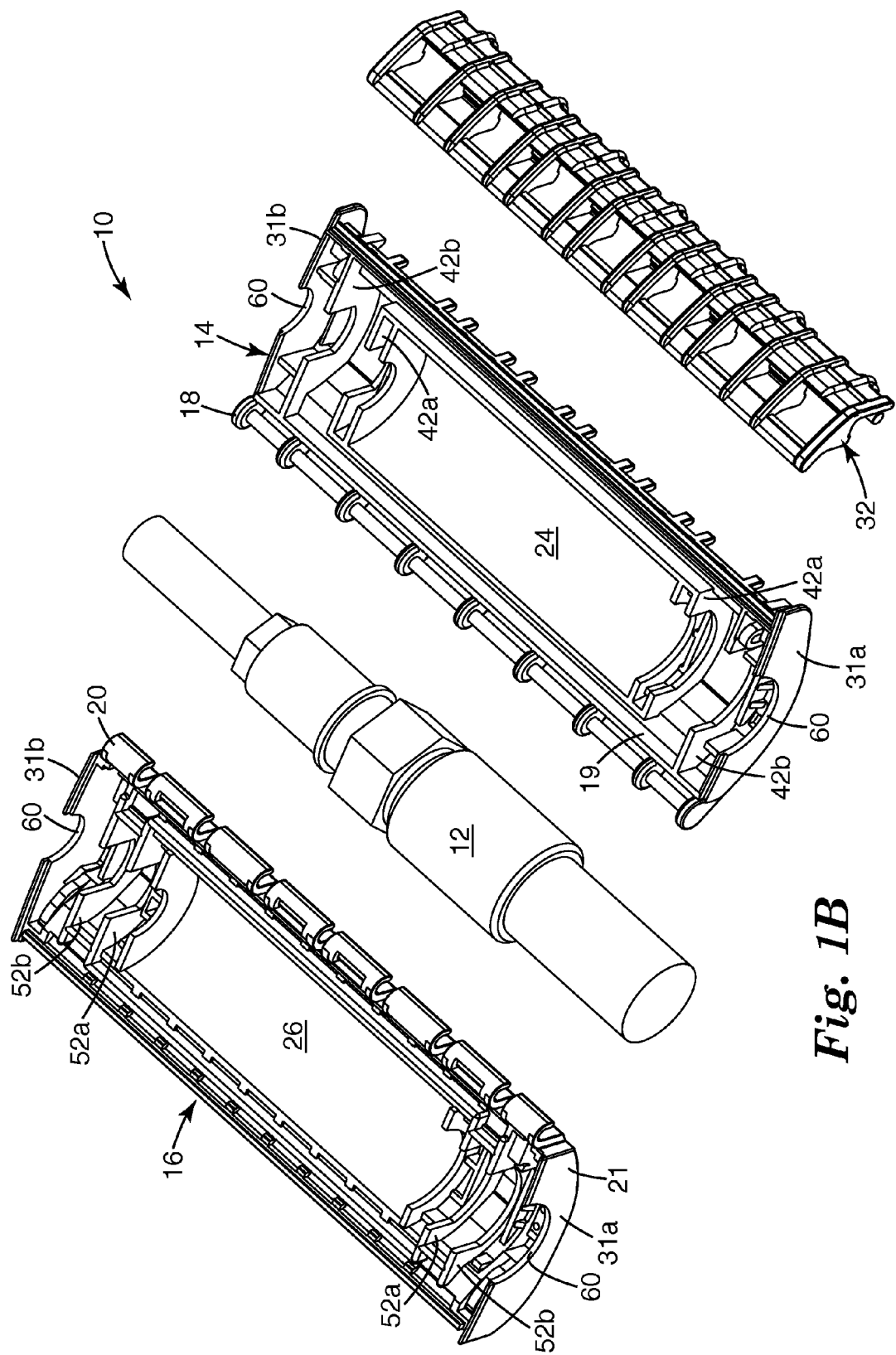
FIG. 1B is a perspective illustration of the splice enclosure of FIG. 1A in an exploded condition.

Referring to FIGS. 1A and 1B, one embodiment of an enclosure 10 for protecting a cable splice 12 is illustrated in an assembled and exploded condition, respectively. Splice enclosure 10 includes a first cover member 14 and a second cover member 16 (also referred to herein as the base and lid, respectively). First and second cover members 14, 16 are configured for engagement with each other and used, in a manner to be described below, to form a protective re-enterable enclosure for cable splice 12. In the illustrated implementation, first and second cover members 14, 16 form a longitudinal or elongated enclosure having a generally oval cross-sectional shape. In other implementations, first and second cover members 14, 16 may assume other shapes or configurations as are required for a particular application.

In one embodiment, first and second cover members 14, 16 are separately formed members and are movably joined to each other at a hinge 17. To form hinge 17, first and second cover members 14, 16 include hinge portions 18, 20, respectively, at first longitudinal side edges 19, 21 thereof. Hinge portions 18, 20 of cover members 14, 16 are configured for rotatable engagement with each other, and thereby rotatably join cover members 14, 16. In one embodiment, hinge portions 18, 20 are configured for snap fit engagement, and may optionally be disengaged by the application of moderate hand force. In another embodiment, cover members 14, 16 are integrally molded with each other and joined at a region of reduced thickness that defines hinge 17. This latter type of hinge is well known and is often referred to as a "living" hinge.

Figure 2:
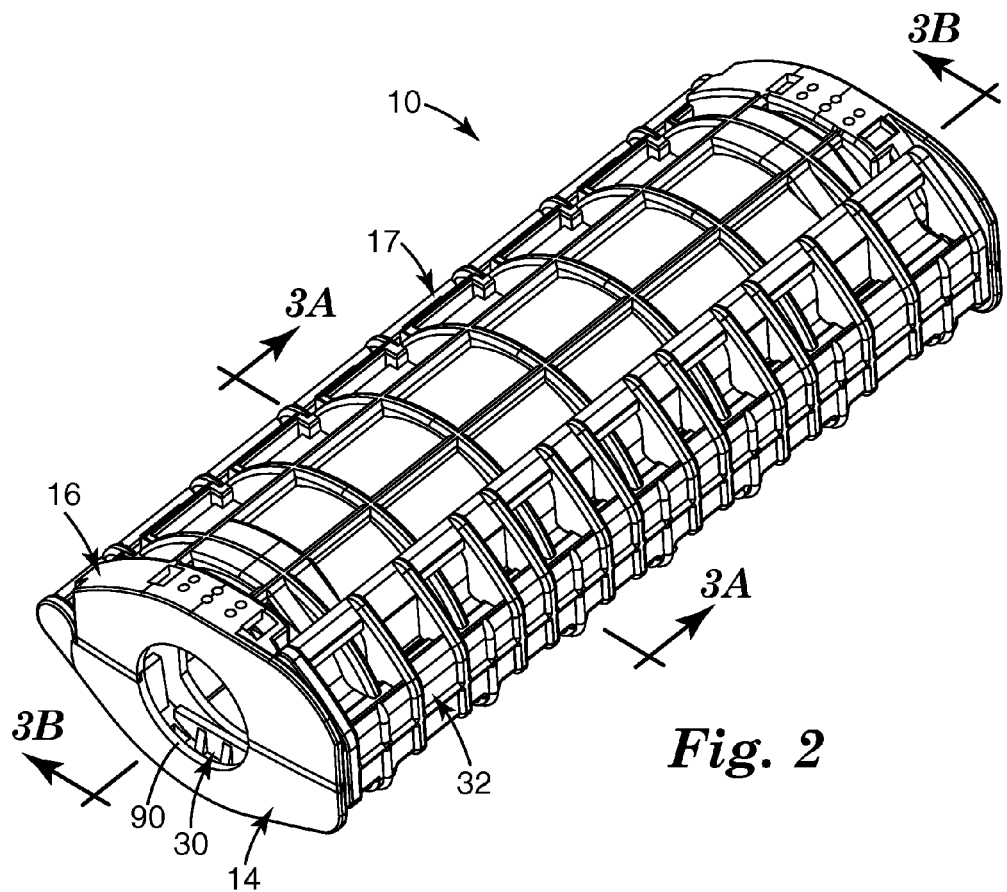
FIG. 2 is a perspective illustration of the splice enclosure of FIG. 1A in a closed position.

Cover members 14, 16 both include internal walls (described in greater detail below) that define central cavity regions 24, 26 respectively. When cover members 14, 16 are folded together about hinge 17 from an open position (FIG. 1)

and brought into engagement with each other to close the splice enclosure 10 (FIG. 2), cavity regions 24, 26 together form a central enclosed cavity 30 for containing the cable splice 12 that is to be protected. In one embodiment, the cables forming splice 12 enter cavity 30 from opposed transverse ends 31a, 31b of enclosure 10.

As seen in FIGS. 1A and 1B, cable entry paths into cavity regions 24, 26 are defined by recesses 60 in each of transverse ends 31a, 31b of first and second cover members 14, 16, as well as end walls 42a, 42b and 52a, 52b thereof In one embodiment, recesses 60 in transverse ends 31a, 31b of first and second cover members 14, 16, as well as the innermost end walls defining cavities 24, 26, thereof, are configured to support splice 12 and the cables thereof. One or more of the end walls 42a, 42b and 52a, 52b are configured to guide molding jigs (not shown) used to define pre-formed shapes of sealant material 70 along the cable entry paths defined by recesses 60, as further described below. In one embodiment, end walls 42a, 42b and 52a, 52b are further configured to longitudinally position splice 12 within cavity 30, and to provide cable pull-out prevention and strain relief features (FIGS. 7A-7B and 8A-8B, described below).

Figure 1D:
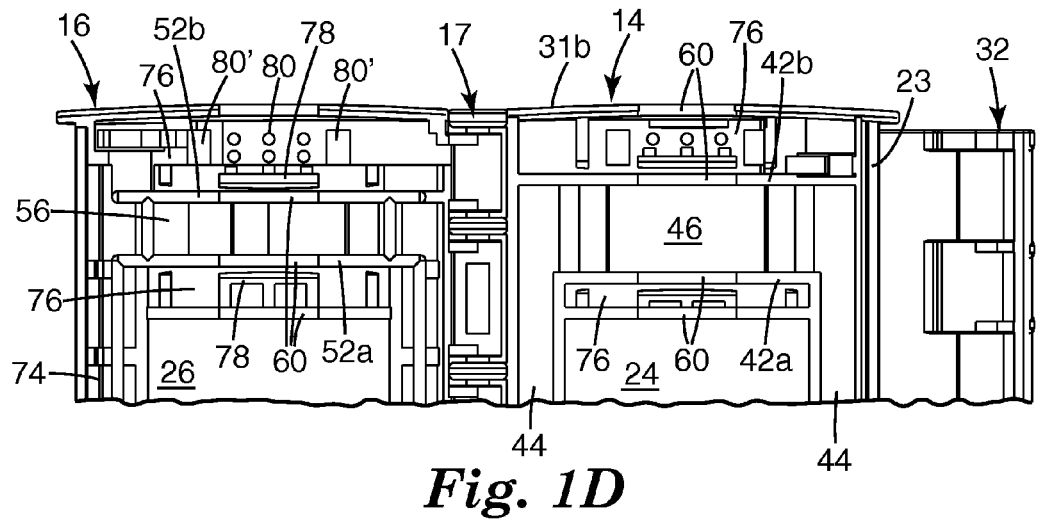
FIG. 1D is an enlarged perspective illustration showing one end of the splice enclosure of FIG. 1A.

Continuing to refer to FIGS. 1A and 1B, and with additional reference to FIG. 1D, the cavity region 24 in first cover member 14 is defined between side walls 40 and double end walls 42a, 42b that stand up from the internal surface of cover member 14. The side walls 40 are located inside the first and second longitudinal side edges 19, 23 of first cover member 14, and extend generally parallel thereto. End walls 42a, 42b are located inside the transverse ends 31a, 31b. End walls 42a extend between the ends of the side walls 40, and end walls 42b extend between longitudinal side edges 19, 23. The spaces 44 between side walls 40 and the adjacent longitudinal side edges 19, 23, and the spaces 46 between respective double end walls 42a, 42b provide a containment space for sealant material 70 (FIG. 1C).

The cavity region 26 in second cover member 16 is defined between side walls 50 and double end walls 52a, 52b that stand up from the internal surface of cover member 16. The side walls 50 are located slightly inside the first and second longitudinal edges 21, 25 of second cover member 16 and extend generally parallel thereto. End walls 52a, 52b are located inside transverse ends 31a, 31b and extend between longitudinal side edges 21, 25. End walls 52a 52b define spaces 56 for containing sealant material 70 (FIG. 1C).

Figure 3A:
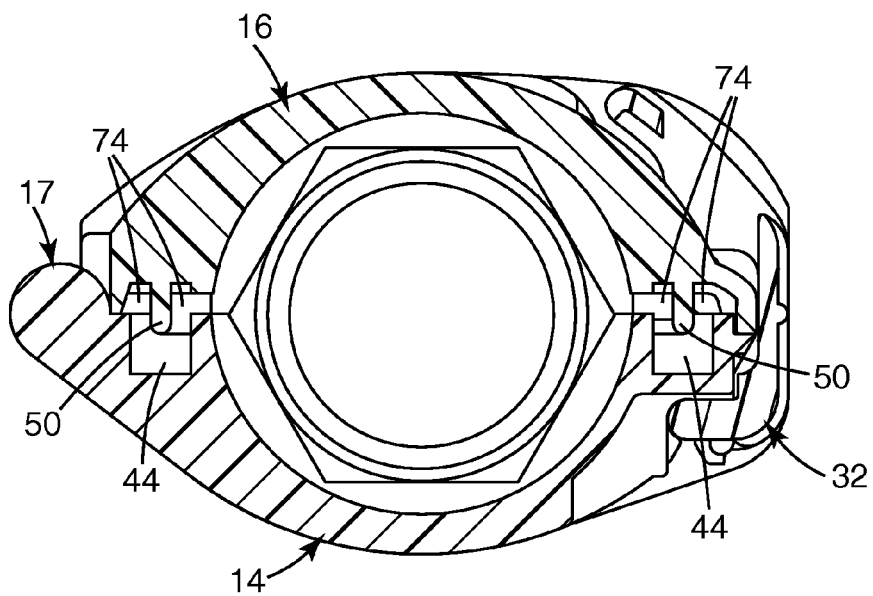
FIG. 3A is a transverse cross-sectional illustration taken along line 3A-3A of FIG. 2.
Figure 3B:
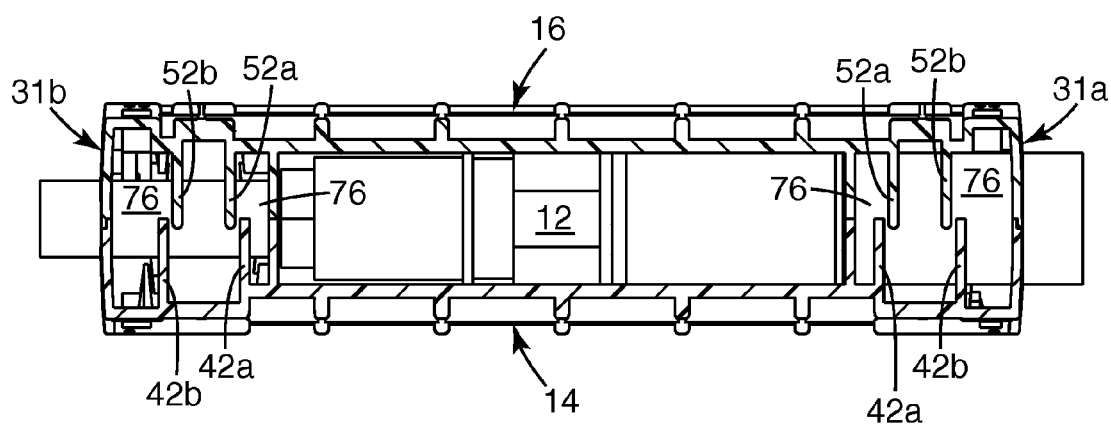
FIG. 3B is a longitudinal cross-sectional illustration taken along line 3B-3B of FIG. 2.
Figure 4A:
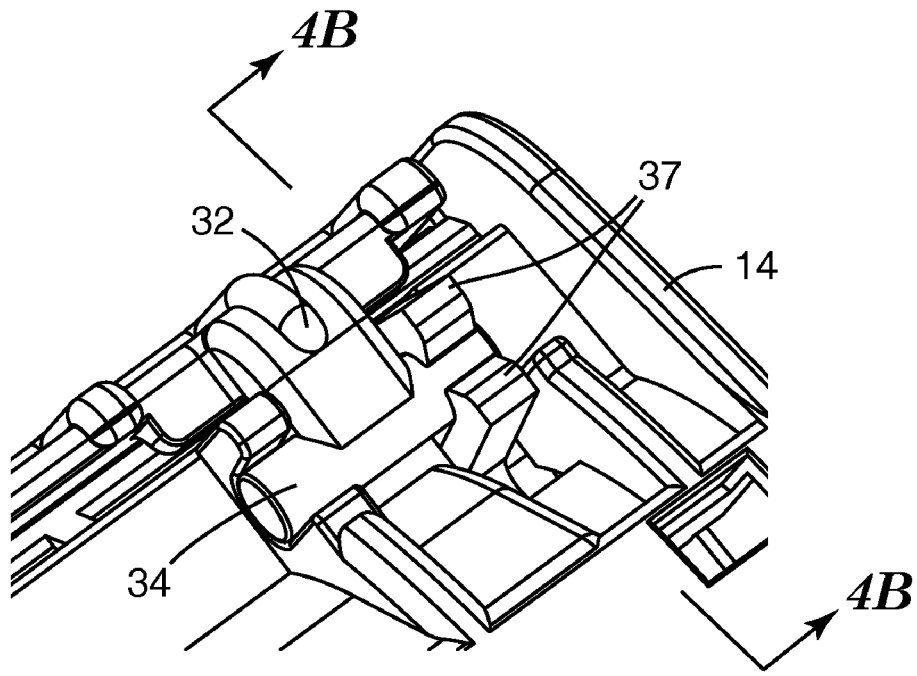
FIGS. 4A and 4B are greatly enlarged perspective illustrations showing one embodiment of a hinge arrangement for attaching a latch to cover members of a splice enclosure, according to the invention.
Figure 4B:
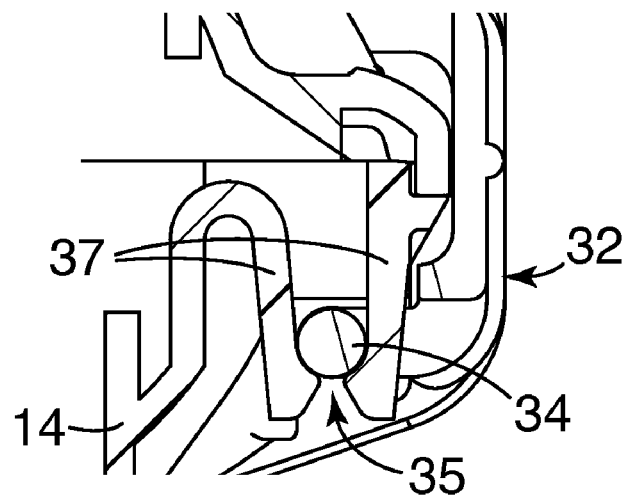

In one embodiment, the side walls 50 and the double end walls 52a, 52b of the cavity region 26 stand up above the level of the longitudinal side edges 21, 25 of the cover member 16 and are positioned such that, when the cover members 14, 16 are folded together into the closed position (FIG. 2), side walls 50 of second cover member 16 telescope into sealant containment spaces 44 in first cover member 14 (FIG. 3A), and end walls 52a, 52b of second cover member 16 telescope into sealant containment spaces 46 in first cover member 14 (FIG. 3B). Depending upon the type of sealant material 70 that is used, as the sealant material 70 in containment spaces 44, 46 and 56 is compressed by this telescoping arrangement of the internal walls, sealant material 70 may flow into overflow spaces 74, 76 adjacent sealant material containment spaces 44, 46 and 56 (FIG. 1C), and keep sealant material 70 inside of closure 10. As best seen in FIGS. 3A and 3B, in one embodiment, overflow spaces 74, 76 extend on both sides of the compressing walls 50, 52a, 52b such that sealant material 70 can overflow on both sides of the compressing walls. Overflow spaces 74, 76 thereby prevent sealant material 70 from flowing into central cavity 30, or outside of enclosure 10. In one embodiment, to prevent sealant material 70 from flowing too much and thereby adversely affect the sealing performance of sealant material 70, a wall 78 is provided in overflow spaces 76 to restrict flow of the gel.

Referring again to FIGS. 1A and 1B, latch 32 is provided to hold cover members 14, 16 together in the closed position. Latch 32 is separately formed from cover members 14, 16, and is configured for rotatable engagement with first cover member 14 at second longitudinal side edge 23 thereof, opposite first longitudinal side edge 19 having hinge portion 18. Latch 32 is further configured to releasably engage a latching space 55 of second cover member 16 at second longitudinal side edge 25 thereof, opposite first longitudinal side edge 21 having hinge portion 20.

With reference to FIGS. 4A and 4B, and FIGS. 5A-5C, in one embodiment, latch 32 includes generally cylindrical hinge portions 34 that engage mating grooves 35 between retaining clips 37 at longitudinal side edge 23 of first cover member 14. In one embodiment, hinge portions 34 are retained in grooves 35 by snap fit with retaining clips 37, and may be disengaged from grooves 35 and retaining clips 37 by moderate hand force or by manually displacing clips 37 from engagement with hinge portions 34.

Figure 5A:
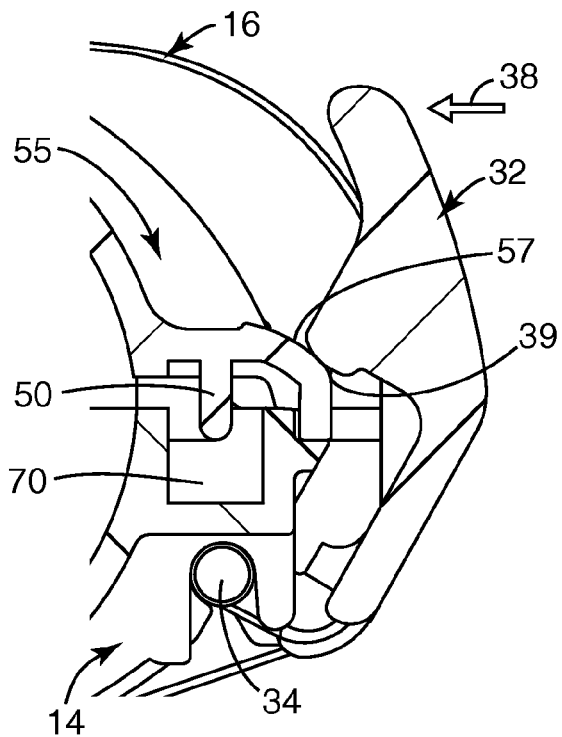
FIGS. 5A, 5B and 5C are cross-sectional illustrations showing one embodiment of a latch engaging cover members of a splice enclosure according to the invention.
Figure 5B:
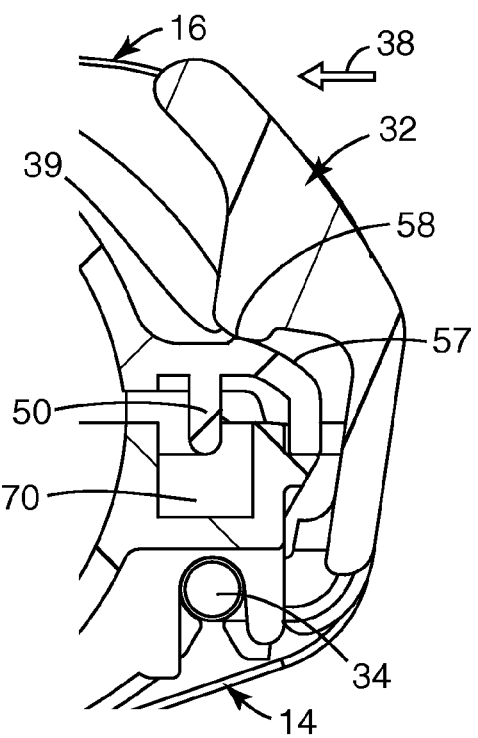
Figure 5C:
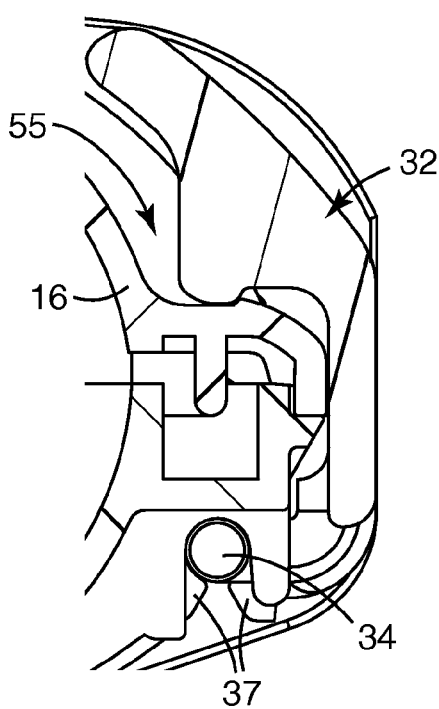

Referring now to FIGS. 5A-5C, operation of one embodiment of latch 32 is described in greater detail. In FIG. 5A, latch 32 has been installed on first cover member 14 as described above, and first and second cover members 14, 16 have been moved toward the closed position. In particular, first and second cover members 14, 16 have been rotated (about hinge 17) until side wall 50 of cavity portion 26 contacts or is near sealant 70 in retaining cavity 44. Latch 32 is rotated about hinge portions 34 in the direction of arrow 38, until boss 39 of latch 32 engages ramped surface 57 of latching space 55 on second cover member 16. As a latching force is applied by the installer and latch 32 is further rotated in the direction of arrow 38, the interaction of boss 39 and ramped surface 57 causes further compression of side wall 50 into sealant 70 (FIG. 5B). When continued application of the latching force and rotation of latch 32 carries boss 39 past ridge 58 in ramped surface 57, the shapes of boss 39 and ridge 58 cooperate to prevent inadvertent disengagement from each other (FIG. 5C). Boss 39 and ridge 58 thereby provide a primary latch retention means.

Figure 6A:
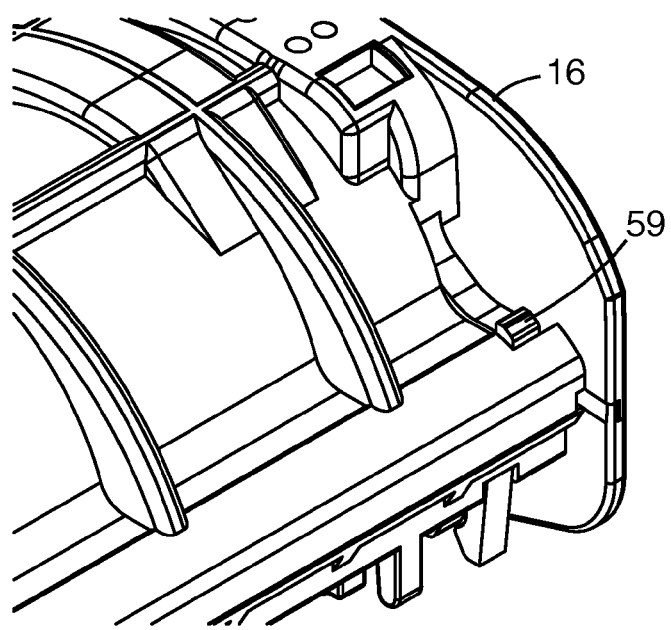
FIGS. 6A and 6B are greatly enlarged perspective illustrations showing one embodiment of a locking arrangement for retaining a latch, according to the invention.
Figure 6B:
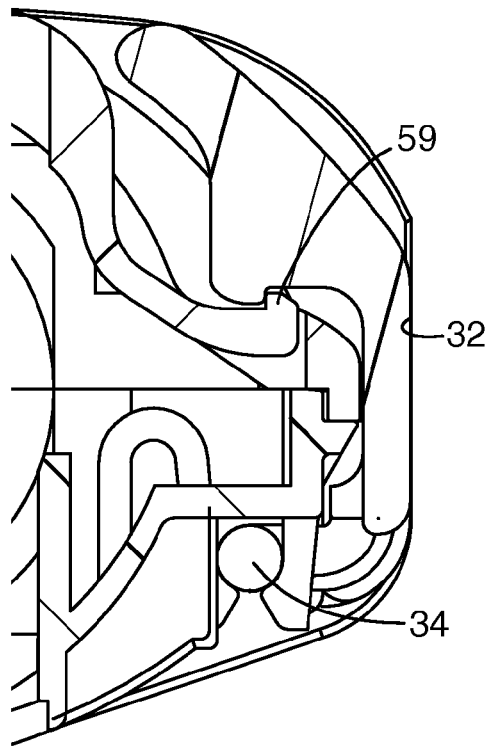

To further ensure latch 32 remains in the final latched position of FIG. 5C, latching space 55 of second cover member 16 may be provided with one or more locking hooks 59 (FIG. 6A) that engage latch 32 in a manner that requires additional force to disengage latch 32 from second cover member 16 (FIG. 6B). Locking hooks 59 thereby provide a secondary latch retention means, in addition to that provided between boss 39 and ridge 58. In one embodiment, boss 39, ramped surface 57, ridge 58 and locking hooks 59 are configured such that when latch 32 transitions from the intermediate position illustrated in FIG. 5B to the final latched position in FIG. 5C, the installer is provided a tactile signal that latch 32 is fully engaged (e.g., a noticeable reduction in the application force, or an audible click). As can be seen in FIGS. 5A-5C, the compression force exerted by latch 32 is directed along a line extending through the sealant containment space 44 (i.e., boss 39 and hinge portion 34 of latch 32 are positioned on opposite sides of containment space 44, and aligned with side wall 50 when latch 32 is fully engaged). The orientation and position of the compression force exerted by latch 32 reduces or eliminates torsional forces acting in opposition to the latch 32 compression force that may otherwise urge latch 32 from the engaged position. In one embodiment the shapes of ramp 57, ridge 58 and boss 39 are configured to provide a substantially continuous compression force of sealant material 70, and help in reducing the closure force applied by a user.

It will be appreciated that the form, location and number of the latches 32 that are used to hold the cover members 14, 16 together in the closed position may be altered from that shown in the figures without departing from the scope and spirit of the invention. For example, the single latch 32 in the illustrated embodiment could be separated into two or more separate latches spaced along the length of splice enclosure 10.

Splice enclosure 10 is prepared for use by first providing sealant material 70 in the sealant containment spaces 44, 46, 56, along the sides of the cavity regions 24, 26. In one embodiment, sealant material 70 is provided in the form of pre-shaped pieces of material (e.g., gel) that are located in the containment spaces 44, 46, 56 of cover members 14, 16. Sealant material 70 may be inserted into containment spaces 44, 46, 56 either at the factory or in the field. As mentioned above, one or more of the end walls 42a, 42b and 52a, 52b are configured to guide molding jigs (not shown) used to define pre-formed shapes of sealant material 70 along the cable entry paths defined by recesses 60. Depending on cable shapes and diameters, the pre-formed shapes of sealant material 70 can comprise any shape that provides the desired water entry protection features. For example, in one embodiment, when viewed along a transverse cross-section of enclosure 10, the pre-formed shapes of sealant material 70 may provide curved (i.e., semi-circular) portions that align with recesses 60 in transverse ends 31a, 31b of first and second cover members 14, 16, as well as end walls 42a, 42b and 52a, 52b thereof (FIG. 1C). Alternately, the pre-formed shapes of sealant material 70 may provide flat surfaces across recesses 60, a combination of curved and flat surfaces, or any other shapes the provide the desired water entry protection features. In one embodiment, sealant material 70 is configured to allow also use of the same closure for different applications (i.e., for connecting different cable sizes or a range of cable sizes including cable sizes larger than are used in conventional closures). In one embodiment, when viewed along a longitudinal cross-section of enclosure 10, the pre-formed shapes of sealant material 70 may have flat, convex or concave surfaces adjacent the cable entry path defined by recesses 60.

Preferably, the sealant material 70 has sufficient long-term resilience to ensure, once it has been compressed by closing the cover members 14, 16, that effective sealing is maintained until the splice enclosure 10 is re-opened. Advantageously, the sealant material 70 permits the splice enclosure 12 then to be re-sealed (and, if required, opened and re-sealed again several times) and to continue to provide the same level of protection for the cable splice. Suitable sealant materials are described in U.S. Publication No. 2005-0167431-A1, which is incorporated herein in its entirety by reference. For example, the sealant material may be a gel, which can include a silicone oil, a vinyl siloxane, a hydrosiloxane, a reaction inhibitor, and/or a catalyst. The sealant material may be filled (e.g. glass microspheres, silica or the like) or unfilled. The sealant material may be formed via addition curing a two-part system (Parts A and B). The silicone oil and the vinyl siloxane are preferably included in about equal amounts in both Parts A and B. However, exact ratios in Part A versus Part B are not critical. The catalyst and reaction inhibitor may then be mixed into Part A, and the hydrosiloxane may be mixed into Part B. The filler materials may be included in equal amounts to both Parts A and B. The two parts (Parts A and B) are then mixed together in one-to-one ratio to form and additionally cure the sealant material. Other suitable sealant materials include, for example, Kraton® gel, polyurethane based gels, and silicon based gels.

The prepared cable splice 12 is positioned in the cavity region 24 of first cover member 14. Cables of splice 12 extend from opposite transverse ends 31a, 31b of cover member 14 along the paths defined by the recesses 60. Second cover member 16 is then folded down onto first cover member 14, around the hinge 17, and latched in the closed position as described with reference to FIGS. 5A-5C above. The central cavity 30 of splice enclosure 10 thereby surrounded by compressed sealant material 70, and cable splice 12 is protected against mechanical impact, cable strain, and against the ingress of moisture. Nevertheless, splice 12 is still readily accessible simply by disengaging latch 32 from second cover member 16 and moving second cover member 16 to the open position.

If cable splice 12 requires a lower level of protection against the penetration of moisture, sealant material 70 is provided only in the containment spaces adjacent lateral ends 31a, 31b of splice enclosure 10 (i.e., in containment spaces 44, 46 of first cover member 14, and in containment space 56 of second cover member 16.

In an alternative aspect, the enclosure can be configured such that sealant material 70 can be used to fill regions 24, 26. The sealant material 70 can be pre-molded to roughly match the shape of the cable splice 12. Upon insertion of the cable splice 12 and closing the enclosure, excess sealant material 70 may flow into one or more of the overflow spaces therein.

Although described herein as used with sealant material 70, splice enclosure 10 can be used without the addition of any sealant material (i.e., in the form shown in FIG. 1) to provide protection against mechanical impact and cable strain, in addition to a basic level of protection against the intrusion of moisture.

Although the splice enclosure 10 described herein provides excellent waterproof performance, means to aid drainage of water away from the cable entry points may also be provided. In one embodiment, as best seen in FIG. 1D, sealant overflow spaces 76 are provided with holes 80 to allow water to flow out of spaces 76. Spaces 76 are shaped to direct water toward holes 80. A portion of holes 80 may additionally be shaped to allow use with a strain relief device, such as a cable tie or clamp, which may be passed through the holes and around the cables of splice 12. In FIG. 1D, holes 80' are made larger and of a different shape (i.e., rectangular instead of round) to allow passage of a cable tie (not shown) therethrough.

Figure 7A:
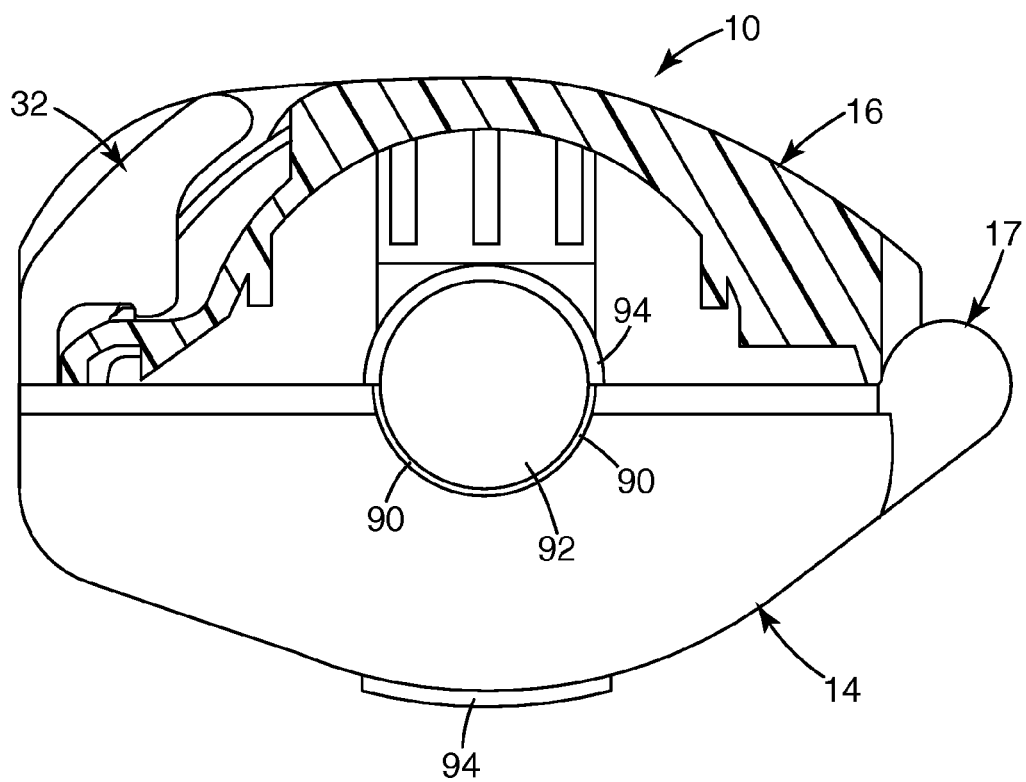
FIGS. 7A and 7B are end and top illustrations, respectively, of one embodiment of cable pull-out prevention and strain relief features according to the invention.
Figure 7B:
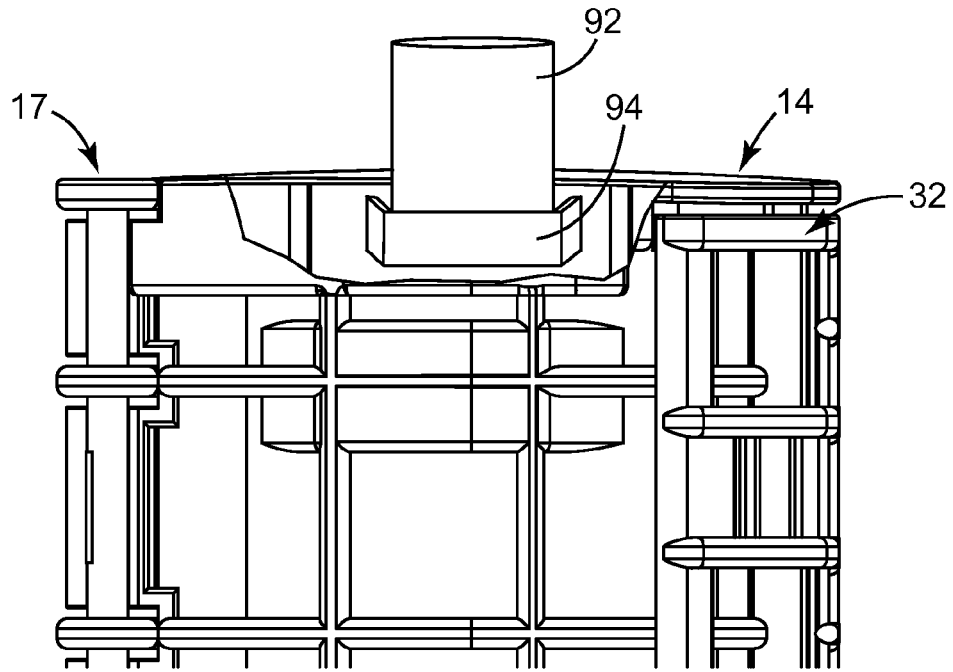

Referring now to FIGS. 7A and 7B, one embodiment of optional cable pull-out prevention and strain relief features is shown and described. In particular, at least one of the recesses 60 defining cable entry paths into closure 10 includes surfaces configured to provide cable pull-out prevention and strain relief features. In one embodiment, at least one of recesses 60 in first cover member 14 include one or more surfaces 90 that define a shape that do not conform to the shape of the cables (e.g., generally circular). In the embodiment illustrated in FIGS. 7A and 7B, surfaces 90 define a generally V-shape or portion of a V-shape. When a cable 92 is laid in the cable entry path, surfaces 90 prevent the cable 92 from resting against the end walls 42a, 42b, thereby maintaining the cable generally in the center of the cable entry path. In this manner, the compression force applied to sealant material 70 in both first and second cover members 14, 16 remains substantially the same. Surfaces 90 also provide cable strain relief by allowing a cable tie 94 to bind cable 92 securely to closure 10, such that the closure 10 cannot rotate about the axis of the cable 92 or associated splice 12.

Figure 8A:
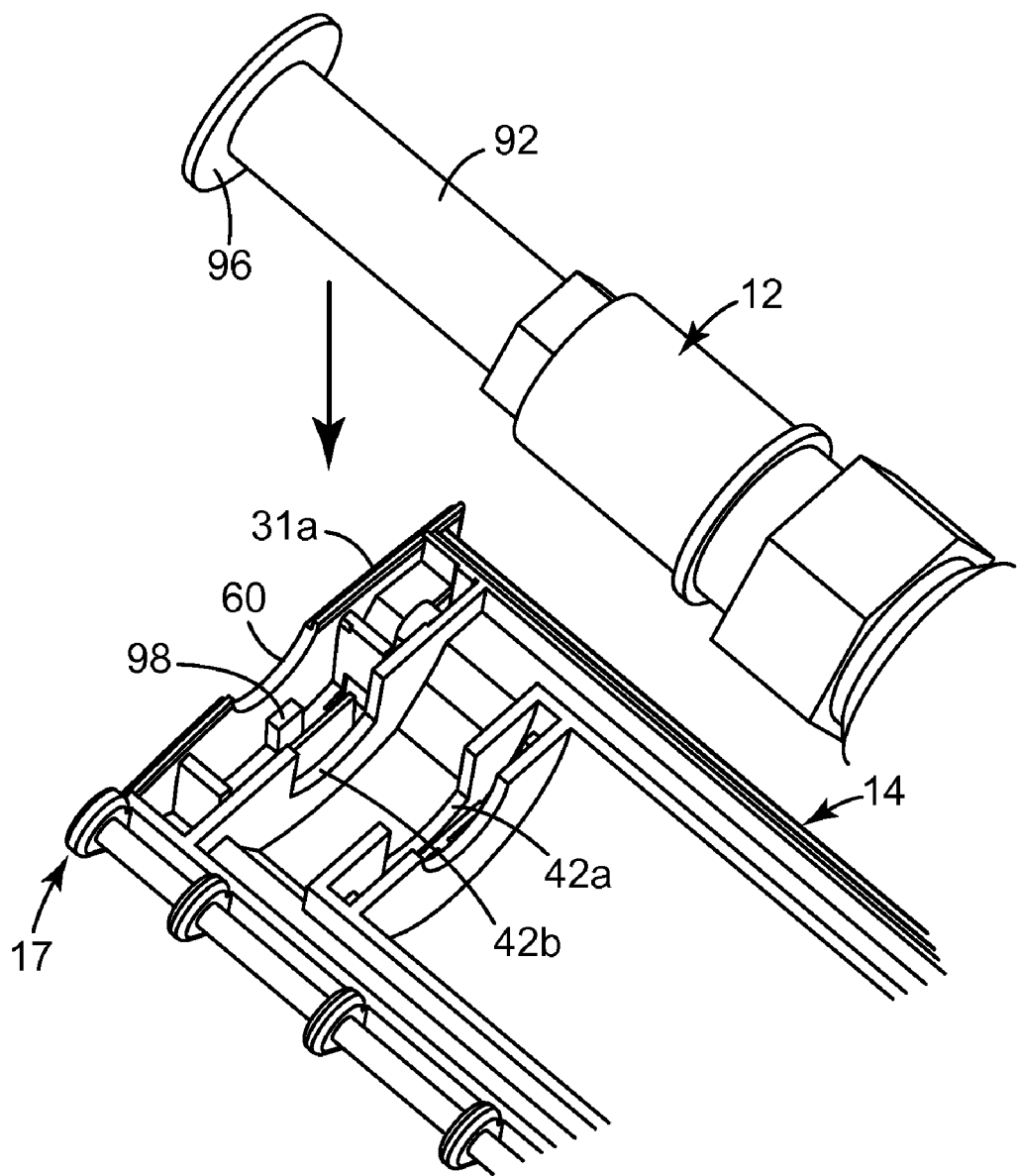
FIGS. 8A and 8B are illustrations of another embodiment of cable pull-out prevention and strain relief features according to the invention.
Figure 8B:
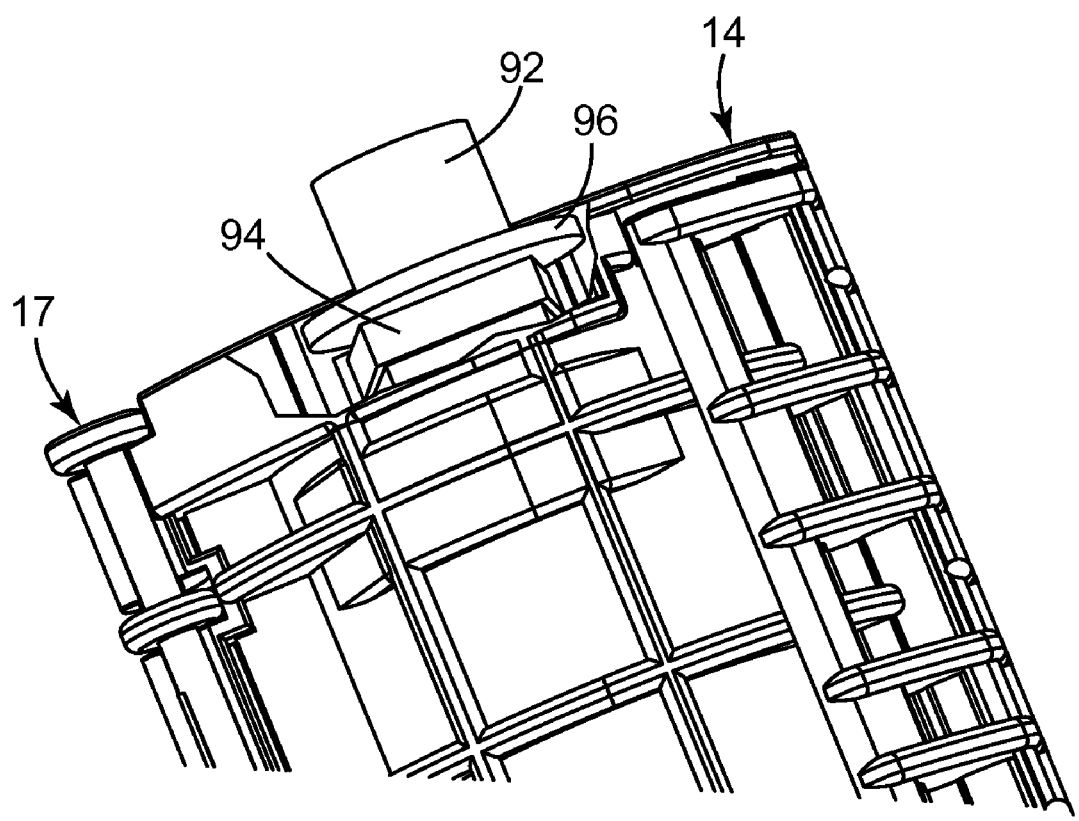

Referring now to FIGS. 8A and 8B, another embodiment of optional cable pull-out prevention and strain relief features is shown and described. A washer 96 is installed over cable 92. The washer 96 is sized to prevent the cable 92, when installed in first cover member 14, from resting against the end walls 42a, 42b and thereby maintaining the cable 92 generally in the center of the cable entry path. In one aspect, a different sized washer can be utilized to accommodate different sized cables, in order to keep the cable axis centered in the closure. In one embodiment, a support boss 98 may be provided within first cover member 14 to position washer 96 and cable 92 in the desired location. In this manner, the compression force applied to sealant material 70 in both first and second cover members 14, 16 remains substantially the same. Washer 96 also provides cable strain relief by allowing cable tie 94 (FIG. 8B) to bind cable 92 securely to closure 10, such that the closure 10 cannot rotate about the axis of the cable 92 or associated splice 12.

In one embodiment, splice enclosure 10 and the components thereof (i.e., cover members 14, 16 and latch 32) are formed from a suitable plastic material, for example polypropylene or polyamide. Cover members 14, 16 and latch 32 may be formed from the same material, or from different materials, depending upon the desired or required material properties. Cover members 14, 16 and latch 32 may be formed using any suitable manufacturing technique, such as injection molding or blow molding.

The splice enclosure 10 as described herein is of simple construction, and uses comparatively few components to enable easy assembly in the field, even at difficult or inaccessible locations. It will be appreciated that a splice enclosure of the same general type as that illustrated in the drawings could be used to protect a so-called "pig tail", or butt, splice (i.e. a splice between cables that extend generally from the same direction, rather than from opposite directions as shown in FIG. 1). In that case, the splice enclosure 10 would require modification to permit the cables to enter the enclosure generally from the same direction, rather than from opposite directions as illustrated in the drawings. Further modification of the cable entry paths of any of the splice enclosures described above with reference to the drawings would enable protection to be provided for splices between different numbers of cables, for example a longitudinal splice between one cable extending from one direction and two cables extending from the other direction.

In addition, the exemplary closures described herein can be used with larger cables than conventional closures because these exemplary closures can control the location of gel displacement when cables are inserted.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A re-enterable enclosure for a cable splice, the enclosure comprising:
   a first cover member;
   a second cover member configured for engagement with the first cover member, the first and second cover members movable between an open position and a closed position, wherein the first and second cover members form a cavity for enclosing the cable splice when the cover members are in the closed position;
   internal walls in at least one of the first and second cover members, the internal walls configured to define a sealant containment space that at least partially surrounds the cavity;
   a sealant disposed in the sealant containment space, wherein the sealant comprises pre-formed shapes retained in the sealant containment space defining generally circular cable entry paths when the first and second cover members are in the closed position;
   at least one latch configured to maintain the first and second cover members in the closed position, the at least one latch configured to exert a compression force along a line extending through the sealant containment space.

2. The enclosure of claim 1, wherein the first and second cover members are rotatably joined adjacent a first longitudinal edge of the cavity, and wherein the sealant containment space extends adjacent at least a second longitudinal edge of the cavity opposite the first longitudinal edge, the at least one latch configured to exert the compression force along a line extending through the sealant containment space that extends adjacent the second longitudinal edge of the cavity.

3. The enclosure of claim 2, wherein the at least one latch is configured to exert the compression force at a plurality of points along the second longitudinal edge of the cavity.

4. The enclosure of claim 2, wherein the at least one latch is configured to exert the compression force along substantially the entire second longitudinal edge.

5. The enclosure of claim 1, wherein the internal walls in at least one of the first and second cover members comprise at least one internal wall in one of the first and second cover members configured to telescope into a sealant containment space in the other of the first and second cover members and thereby compress sealant material contained therein when the first and second cover members are in the closed position.

6. The enclosure of claim 1, wherein internal walls in at least one of the first and second cover members comprise internal walls in both of the first and second cover members, the internal walls defining a plurality of sealant containment spaces that at least partially surround the cavity.

7. The enclosure of claim 6, wherein the first and second cover members define cable entry paths into the cavity, and wherein the sealant containment spaces surround the cable entry paths when the first and second cover members are in the closed position.

8. The enclosure of claim 7, wherein the cable entry paths define generally circular apertures into the cavity, wherein the sealant surrounding the cable entry paths is coaxially aligned with the cable entry paths.

9. The enclosure of claim 1, wherein surfaces of the pre-formed shapes define the cable entry paths, and wherein said surfaces have a longitudinal cross-section that is one of flat, convex and concave.

10. The enclosure of claim 1, wherein when the latch maintains the first and second cover members in the closed position, the latch in maintained in position by a primary latch retention means and a secondary latch retention means.

11. The enclosure of claim 1, wherein when the latch comprises a single unit.

* * * * *